United States Patent
Fan

(10) Patent No.: US 7,327,898 B2
(45) Date of Patent: Feb. 5, 2008

(54) REDUCING BOUNDARY EFFECTS FOR IMAGES WITH SCREEN PATTERNS

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 776 days.

(21) Appl. No.: 10/612,060

(22) Filed: Jul. 1, 2003

(65) Prior Publication Data

US 2005/0002588 A1    Jan. 6, 2005

(51) Int. Cl.
*G06K 15/00* (2006.01)
*G06K 9/40* (2006.01)

(52) U.S. Cl. .............. 382/275; 382/264; 382/266; 382/267; 382/268; 358/3.06

(58) Field of Classification Search ........ 358/3.06–3.2; 382/260–275, 264, 266–268
See application file for complete search history.

(56) References Cited

U.S. PATENT DOCUMENTS 5,745,660 A * 4/1998 Kolpatzik et al. ......... 358/3.19
5,822,469 A * 10/1998 Silverstein ................. 382/267
5,956,157 A * 9/1999 Tai ............................ 358/3.24
6,947,178 B2 * 9/2005 Kuo et al. .................. 358/3.08

OTHER PUBLICATIONS

U.S. Appl. No. 10/600,139, filed Jun. 20, 2003, Fan.

* cited by examiner

*Primary Examiner*—Matthew C. Bella
*Assistant Examiner*—Wes Tucker
(74) *Attorney, Agent, or Firm*—Oliff & Berridge, PLC

(57) ABSTRACT

A method is disclosed which reduces the boundary effects on an image based on maintaining local gray. The image is first halftoned and an adjustment is then made at the boundary region to minimize the brightness deviation of the halftone from the original contone. The adjustment is composed of three steps. First, a low-pass filtering is performed in halftones in the boundary regions, which are typically a few pixels wide along the boundary. The filtering result is then compared to the original contone image and an error map is generated. Finally, the pixels in the boundary regions are adjusted to reduce the magnitudes of the errors.

12 Claims, 2 Drawing Sheets

REDUCING BOUNDARY EFFECTS FOR IMAGES WITH SCREEN PATTERNS

The introduction of the plain paper copier has resulted in a proliferation of paper copies of paper originals. A similar result is happening to electronic images, given the easy availability of digital scanners and a quick and widespread access to images throughout the Internet. Currently it is very difficult for the creator of an image to generate an electronic original, for which she can be assured that illegal copies will not be spread to third parties. The use of imbedded invisible or partially visible information in the document is a technology that aims to prevent that spread. Applying different halftones at different parts of images can perform information embedding. One of the examples is the generation of Glossmarks. Another example is to use different halftones for embedding text that is not perceptible by naked eyes, but becomes visible when the document is copied. Yet another example is to use halftone patterns to embed information in images that can be later retrieved by optical or digital means. In all of the above examples, it is important that the imbedded information not be disturbing or distracting to the original content of the image. The imbedded information could be added either by the scanner or by halftoning software.

While either or both visible or invisible watermarks are desirable in an image, they represent different techniques for either preventing copying or detecting copying. It is anticipated that document producers may wish to use both kinds of protection.

SUMMARY

A method is disclosed which reduces the boundary effects on an image based on maintaining local gray. The image is first halftoned and an adjustment is then made at the boundary region to minimize the perceptual brightness deviation of the halftone from the original contone. The adjustment is composed of three steps. First, a low-pass filtering is performed in halftones in the boundary regions, which are typically a few pixels wide along the boundary. The filtering result is then compared to the original contone image and an error map is generated. Finally, the pixels in the boundary regions are adjusted to reduce the magnitudes of the errors.

DESCRIPTION OF THE DRAWINGS

Figure 1:
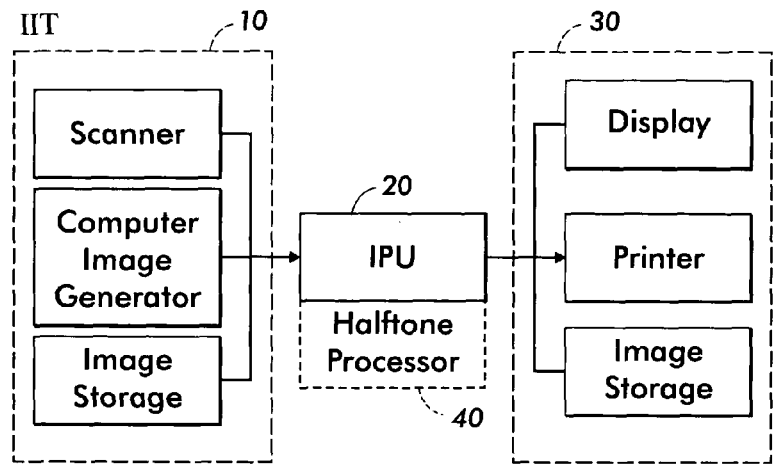
FIG. 1 represents a system in which the present invention may find particular use.

For a general understanding, reference is made to the drawings wherein like reference numerals have been used throughout to designate identical elements. Each location in an image may be called a "pixel." In an array defining an image in which each item of data or image signal provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining the image.

With reference now to FIG. 1 there is shown a general system representing an electronic representation of an original document obtained from an image input terminal 10 in a format related to the characteristics of the device and commonly with pixels defined at n bits per pixel. The electronic image signals will be directed through an image processing unit (IPU) 20 to be processed so that an image suitable for reproduction on image output terminal 30 is obtained. Image processing unit (IPU) 20 commonly includes a halftone processor 40 which converts m-bit digital image data signals to n-bit image data signals suitable for driving a particular printer or other device where m and n are integer values. Commonly, the images may be represented in a page description language format, describing the appearance of the page. In such a case, the IPU 20 may include a processing element for decomposition of the page, and color conversion elements for providing appropriate signals to drive a printer.

Figure 2:
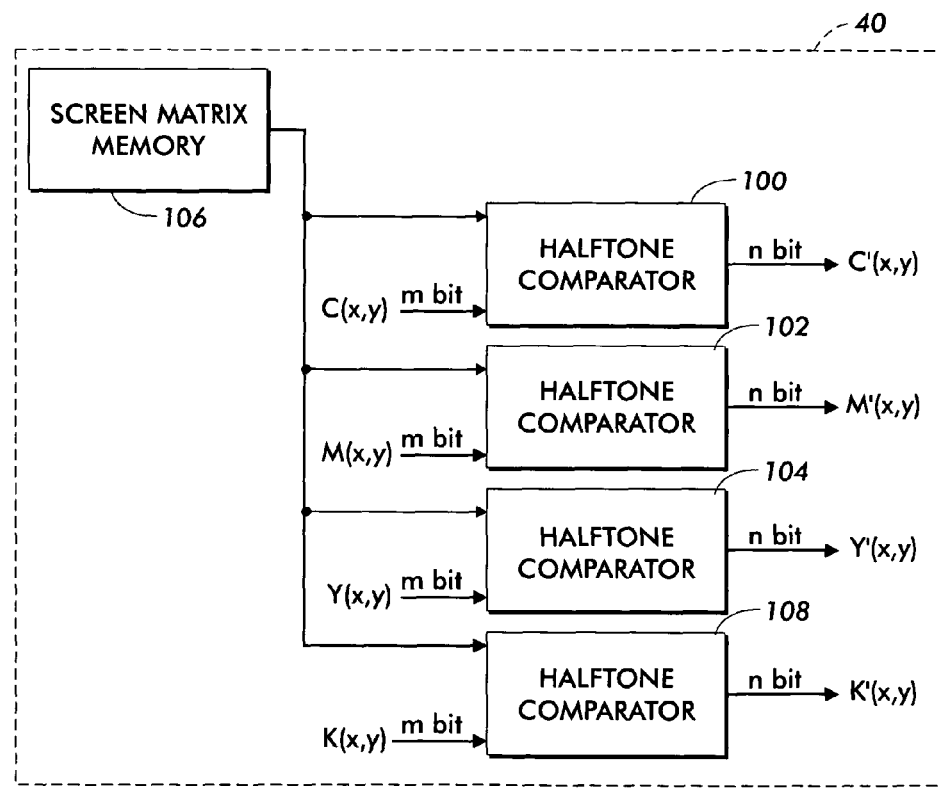
FIG. 2 is an illustration of a halftoning arrangement to produce a halftone image.

FIG. 2 shows the operational characteristics of halftone processor 40. In this example, there is illustrated a color processing system using four separations, $C(x,y)$, $M(x,y)$, $Y(x,y)$, and $K(x,y)$, obtained in each process independently for halftoning purposes to reduce an m-bit input to an n-bit output. It will be appreciated that the invention is also applicable to a single color separation or black and white reproduction situations as well. As depicted in FIG. 2 a source of screen matrix information, screen matrix memory 106 provides an input to each comparator 100, 102, 104, 106, and 108 for each color separation. The other input to each comparator is the m-bit color separation image data. The output of each comparator is n-bit output that can be directed to a printer or similar device for rendering. This illustration is highly simplified in that distinct screen matrices may be supplied to each comparator.

Applying different halftones at different parts of the image may create special effects. One of the examples is the generation of the Glossmarks. Another example is to use different halftones for embedding text that is not perceptible by naked eyes, but becomes visible when the document is copied. Yet another example is to use halftone patterns to embed information in images that can be later retrieved by optical or digital means. Most of these cases require seamless switching among different halftones. The method of the present invention proposes to reduce the boundary effects based on maintaining local gray. The image is first halftoned. An adjustment is then made at the boundary region trying to minimize the perceptual brightness deviation of the halftone from the original contone.

Figure 3:
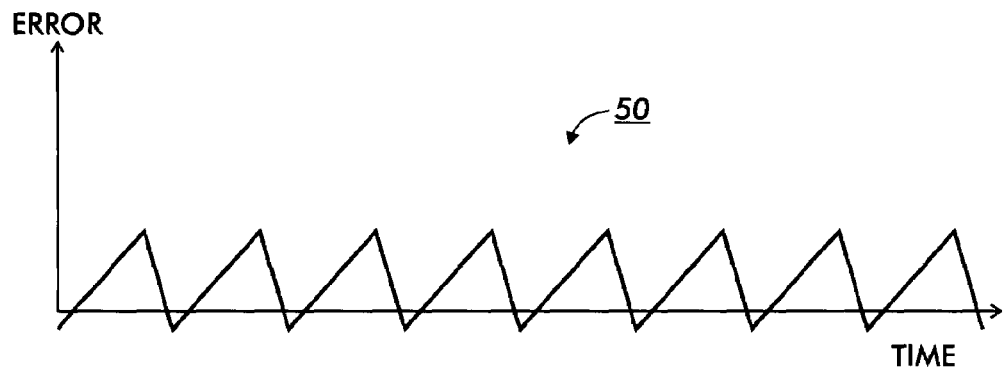
FIG. 3 graphically shows the error when only one halftone is applied.
Figure 4:
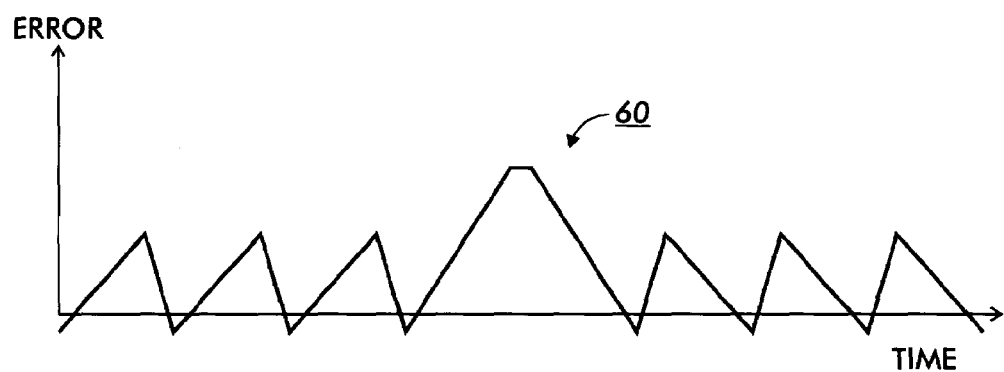
FIG. 4 graphically shows the error when two halftones are applied.

To ensure seamless transition, different halftones applied in the image usually have same (or very similar) TRC response. Experiments show that the visibility of the boundaries between different halftone regions is mainly caused by local gray level changes. In halftoning a relatively smooth image region, the local gray is usually retained. Specifically, the local average gray levels of the halftone usually fluctuate in a tight range around the original contone value. However, this may not be true when switching from one halftone to another. At certain spots, the error could become much larger. This is illustrated in FIGS. 3 and 4. In both figures, errors of one scan line are shown. The horizontal axis gives the pixels location and the vertical axis is the value of the error. FIG. 3 shows the error 50 when only one halftone is applied, while in FIG. 4 two different halftones are used to generate the error 60. It should be noticed that even in FIG.

3, where only one screen is applied, the errors are typically not zero. They fluctuate in a small range, usually not symmetrically around zero. The fluctuation is referred to as "inherent fluctuation". Compared to FIG. 3, errors in FIG. 4 behave similarly at two sides of the figure, but become larger at the middle where the halftone switching occurs. This makes boundary visible.

The method proposed reduces the boundary effects based on maintaining local gray. The image is first halftoned. An adjustment is then made at the boundary region trying to minimize the brightness deviation of the halftone from the original contone. The adjustment is composed of three steps. First, a low-pass filtering is performed in halftones in the boundary regions, which are typically a few pixels wide along the boundary. The filtering result is then compared to the original contone image and an error map is generated. Finally, the pixels in the boundary regions are adjusted to reduce the errors.

In the first step, the cutoff frequency of the low-pass filter is typically chosen to be around halftone frequency. In the second step, the error at a pixel (m,n) is generated. In calculating error, the inherent fluctuation and is taken into consideration. Specifically, the error at pixel (m,n) is evaluated as:

$$d(m,n)-\text{lower}(c), \text{ if } d(m,n)<\text{lower}(m,n)$$

$$e(m,n)=d(m,n)-\text{upper}(c), \text{ if } d(m,n)>\text{upper}(m,n)$$

0, otherwise where d(m,n) is the difference between the filter result f(m,n) and the original contone value c(m,n). Lower(c) and upper (c) are the lower and upper bounds of the inherent fluctuation when input contone is uniform of value c. They can be tabulated off-line.

In the last step, pixels are adjusted to reduce the error. This may be performed sequentially or starting from pixels with larger errors (in terms of magnitude) to the ones with smaller errors. The former needs less computation, while the latter may provide better image quality. The halftone of a pixel is altered, if its error exceeds a certain magnitude. The error map is updated after each change.

It is, therefore, apparent that there has been provided, in accordance with the present invention, a method and apparatus for providing digital watermarks. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for reducing boundary effects in images with mixed screen patterns, comprising:
   halftoning an original contone image, resulting in a halftone image with a plurality of halftone portions, each halftone portion comprising a portion of the image halftoned by a halftone, at least two halftone portions comprising portions of the image halftoned by different halftones;
   adjusting boundary regions located between halftone portions of the halftone image to minimize a brightness deviation between the boundary regions and the original contone image;
   choosing a cutoff frequency for low-pass filtering; and
   performing a low-pass filtering of halftones in the boundary regions, a boundary region having a width that is one or more pixels wide.

2. The method according to claim 1 for reducing boundary effects in images, wherein low-pass filtering further comprises:
   choosing a cutoff frequency for the low-pass filtering that is substantially the halftone frequency.

3. The method according to claim 1 for reducing boundary effects in images, wherein adjusting boundary regions further comprises:
   comparing a filtered portion of the halftone image to a corresponding portion of the original contone image and generating an error map.

4. The method according to claim 1 for reducing boundary effects in images, wherein adjusting boundary regions further comprises:
   comparing a filtered portion of the halftone image to a corresponding portion of the original contone image to generate an error map that includes an error at a pixel (m,n).

5. The method according to claim 4 for reducing boundary effects in images, further comprising:
   adjusting pixels in the boundary regions to reduce a magnitude of errors stored in the error map that correspond to the pixels.

6. The method according to claim 4 for reducing boundary effects in images, further comprising:
   adjusting sequentially the pixels in the boundary regions to reduce a magnitude of the errors stored in the error map that correspond to the pixels.

7. The method according to claim 4 for reducing boundary effects in images, further comprising:
   adjusting the pixels in the boundary regions by first adjusting pixels with errors larger than the errors associated with other pixels in the boundary regions to reduce a magnitude of the errors stored in the error map that correspond to the pixels with larger errors.

8. A method for reducing boundary effects in images with mixed screen patterns, comprising:
   means for halftoning an original contone image, resulting in a halftone image with a plurality of halftone portions, each halftone portion comprising a portion of the image halftoned by a halftone, at least two halftone portions comprising portions of the image halftoned by different halftones;
   means for adjusting a boundary region located between the halftone portions of the halftone image to minimize a brightness deviation between the boundary regions and the original contone image;
   means for performing a low-pass filtering of halftones in the boundary regions, a boundary region having a width that is one or more pixels wide; and
   means for choosing a cutoff frequency for the low-pass filtering.

9. The method according to claim 8 for reducing boundary effects in images, wherein low-pass filtering further comprises:
   means for choosing a cutoff frequency for the low-pass filtering that is substantially the halftone frequency.

10. The method according to claim 8 for reducing boundary effects in images, wherein adjustment further comprises:
    means for comparing a filtered portion of the halftone image to a corresponding portion of the original contone image and generating an error map.

11. The method according to claim 8 for reducing boundary effects in images, wherein adjustment further comprises:

means for comparing a filtered portion of the halftone image to a corresponding portion of the original contone image and generating an error map that includes an error at a pixel (m,n).

12. The method according to claim 11 for reducing boundary effects in images, further comprising:

means for adjusting pixels in the boundary regions to reduce a magnitude of errors stored in the error map that correspond to the pixels.

* * * * *